United States Patent [19]

Parks

[11] 4,344,875

[45] Aug. 17, 1982

[54] ORGANOTIN ANTIFOULING COATING WITH EPOXY AND POLYACRYLATE COMPOSITIONS

[75] Inventor: Albert R. Parks, Glen Burnie, Md.

[73] Assignee: The United States of America as represented by the Secretary of the Navy, Washington, D.C.

[21] Appl. No.: 277,455

[22] Filed: Jun. 26, 1981

[51] Int. Cl.$^3$ ................................................. C08K 3/00
[52] U.S. Cl. ................................. 424/78; 106/15.05; 523/122; 523/400; 523/456; 260/42; 424/288; 525/113
[58] Field of Search .................. 424/288; 525/113; 260/32.8 EP, 32.8 R, 33.2 R, 33.2 EP, 37 EP, 42; 106/15.05

[56] References Cited

U.S. PATENT DOCUMENTS

| | | | |
|---|---|---|---|
| 3,016,369 | 1/1962 | Montermoso et al. | 260/80 |
| 3,301,795 | 1/1967 | Wooster | 260/2 |
| 3,382,264 | 5/1968 | Leebrick | 260/432 |
| 3,417,045 | 12/1968 | Henson et al. | 260/33.6 |
| 3,532,538 | 10/1970 | Le Doux et al. | 260/834 |
| 3,676,388 | 7/1972 | Davie | 260/28 |
| 3,930,971 | 1/1976 | Karoly et al. | 526/112 |
| 3,979,354 | 9/1976 | Dyckman et al. | 260/37 EP |
| 4,064,338 | 12/1977 | Russell | 526/230 |
| 4,172,177 | 10/1979 | Sato | 106/15.05 |
| 4,174,339 | 11/1979 | Matsuda et al. | 106/15.05 |

*Primary Examiner*—Lorenzo B. Hayes
*Attorney, Agent, or Firm*—R. F. Beers; L. A. Marsh

[57] ABSTRACT

An antifouling coating composition includes an antifouling compound formed of the esterification product of tributyltin oxide combined with the copolymer of styrene and maleic anhydride. The antifouling compound is combined with a blend of selected Bisphenol A epoxy and polyacrylate resins, solvent, fillers, pigment, and amine based curing agent to provide a durable marine coating which exhibits controlled leaching of antifoulant.

5 Claims, No Drawings

ORGANOTIN ANTIFOULING COATING WITH EPOXY AND POLYACRYLATE COMPOSITIONS

BACKGROUND OF THE INVENTION

This invention generally relates to improvements in the formulation and production of marine antifouling compositions and more particularly, to organotin-based antifoulants for epoxy coatings.

In the past, salts and oxides of metals such as copper, zinc, arsenic and mercury have been used in marine antifouling coatings. However, some of these compounds cause corrosion of the metal substrate and degradation of the paint coatings, as well as having a limited service life. Organotin based antifoulants such as tributyltin oxide and tributyltin fluoride have been developed to overcome some of the abovementioned drawbacks with the prior antifoulants. Although the organotin antifoulants are compatible with conventional antifouling coating systems, most coating systems contain various water soluble pigments, fillers and binders so that the antifoulant leaches into the water at an uncontrolled rate. In attempting to control the leaching rate of the antifoulants, various polymeric compounds have been developed as exemplified, for example, by U.S. Pat. Nos. 3,016,369; 3,382,264; 3,930,971; 3,979,354; 4,064,338; 4,075,319; and 4,174,339.

However, the reaction process of combining organotin oxides and hydroxides with various polymeric materials to control leaching, as discussed in the abovementioned patents, is more complex and costly than conventional preparation processes for other antifoulants. For example, the reaction processes disclosed in U.S. Pat. Nos. 3,979,354 and 4,075,319 generally involve the esterification of an organotin compound with the acid group of a vinyl polymer. This reaction process not only produces water as a reaction by-product but also involves the sequential use of various solvents which must be removed along with the water to obtain a solids solution. The solids are then dissolved in another solvent to prepare the final coating composition. The process of making organometallic antifoulants envisioned by the present invention eliminates reaction steps disclosed by the prior art by eliminating the production of water by-product and by the utilization of polymeric materials and solvents therefore that reduces the number of solvation-distillation steps. It was also found that the particular polymeric materials used to react with the organotin antifoulant exhibits controlled leaching characteristics not contemplated by the prior art.

Epoxy coating formulations are generally exemplified by U.S. Pat. Nos. 3,301,795; 3,417,045; 3,532,538; 3,676,388; and 4,172,177. Although antifoulant materials have been incorporated into an epoxy matrix such as disclosed, for example, in U.S. Pat. No. 3,676,388, problems have been experienced in providing uniform dispersion of antifoulant throughout the coating and controlling the leaching rate of antifoulant therefrom.

SUMMARY OF THE INVENTION

The antifouling coating system of the present invention overcomes drawbacks experienced with the prior art by providing a durable antifouling coating which is simple to manufacture, easy to apply to ship surfaces, and which exhibits a controlled long-term leaching of antifoulant. This is accomplished by initially reacting a copolymer of styrene and maleic anhydride with tri-n-butyltin oxide to form an esterification product. Preferably, one mole of styrene-maleic anhydride is reacted with from 0.4 to 0.8 mole of tributyltin oxide to esterify from about 40% to about 80% of the maleic anhydride groups, with the unreacted maleic anhydride groups being utilized to crosslink with compatible epoxy resin types, such as diglycidyl ether of bisphenol A, blended with selected polyacrylates. When blended with other compatible coating materials such as selected resins, binders, pigments and fillers the crosslinked organotin polymer and epoxy based coating system can be formulated to optimize coating longevity, provide coating strength and durability, and permit easy application.

Accordingly an object of the present invention is to provide an inexpensive method for producing an efficient, long-lasting organometallic antifoulant.

Another object of this invention is the provision of an antifouling composition for preventing biological growths on submerged surfaces for an extended period of time.

A further object of the present invention is to provide an antifouling composition which is durable, nonpolluting, and effective in preventing fouling.

Yet another object of this invention is to provide an antifoulant formulation characterized by a controlled, low leaching rate of the antifouling agent from the coating matrix.

DESCRIPTION OF THE PREFERRED EMBODIMENTS

The present invention provides an improved organotin antifoulant coating possessing low leaching, nonpolluting, biological properties which exhibits controlled leaching characteristics when chemically incorporated with selected epoxy and polyacrylate compounds. The resulting organometallic polymers are surface hydrolyzed in sea water to initiate the antifouling action and the organometallic compounds are released at a rate that is dependent not only on the nature of the organometallic polymer but also on environmetnal conditions such as water temperature, oxygen content, and hydrogen ion concentration. Thus, hydrolysis of the organometallic compounds can be controlled to provide long-term antifouling protection while reducing the pollution hazards. Preferably, the organotin compounds are incorporated into a polymeric material through an esterification reaction between the organotin compound and the anhydride functional groups of the polymeric material.

The organotin compounds are of the general form $(R_3Sn)_2O$ where R represents butyl, propyl or phenyl groups with tributyltin oxide being preferred because of its higher toxicity levels towards marine life.

Suitable polymeric resins with which organotin compounds may be chemically combined include thermoplastic polymers, such as vinyl polymers, and thermosetting polymers, such as polyester resins. Preferred polymeric materials comprise copolymers resulting from the copolymerization of a,B-unsaturated carbonyl compounds, more particularly carboxylic acid anhydrides (ie. maleic anhydride), and unsaturated alkenes, such as allylbenzenes (ie. styrene). An example of a preferred compound is the copolymer of styrene and maleic anhydride, as shown below:

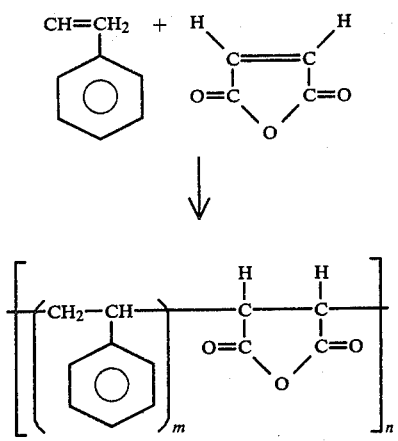

Preferably, m varies from 1 to 3 and n ranges from about 6 to about 8 so that the copolymer provides a means for controlling the uniform distribution of organotin oxide antifoulant throughout the polymer matrix. This particular range of variables was also found to provide good cross-linking between the unreacted maleic anhydride groups (ie. after esterification with tributyltin oxide) and permit controlled leaching of the antifoulant from the coating matrix. Accordingly, the average molecular weight of the styrene-maleic anhydride copolymer should range from about 1600 to about 2500. Commercial styrene-maleic anhydride copolymer is produced by ARCO Chemical Company, a division of Atlantic-Richfield Company under the trademark SMA Resins, characteristic examples of which are set forth below and in a copending U.S. patent application Ser. No. 266,236 filed May 22, 1981 by Albert R. Parks and Stephen D. Rodgers and entitled ORGANOTIN-EPOXY ANTIFOULING COATING.

intermediary for interlinking the organotin oxide antifoulant with the epoxy matrix of the coating. Suitable solvents for the esterification process between the styrene-maleic anhydride copolymer and the organotin oxide include aromatic hydrocarbons such as toluene and xylene; super high flash naptha such as manufactured by AMSCO Chemical Co.; and mineral spirits (ie. MIL-SPEC-TT-T-291E), although mineral spirits must normally be used with another solvent. Since the solvent is not separated from the esterification product before the esterification products are further combined with the selected epoxy and polyacrylate materials, the solvent should be compatible therewith. The amount of solvent required for the esterification of tributyltin oxide and the styrene-maleic anhydride copolymer depends upon the viscosity and percent of solids in the final product that is desired, with the solvent ranging generally from about 10% to about 50%, by weight, of the reactants. The esterification process of the styrene-maleic anhydride copolymer and tributyltin oxide antifoulant is shown below:

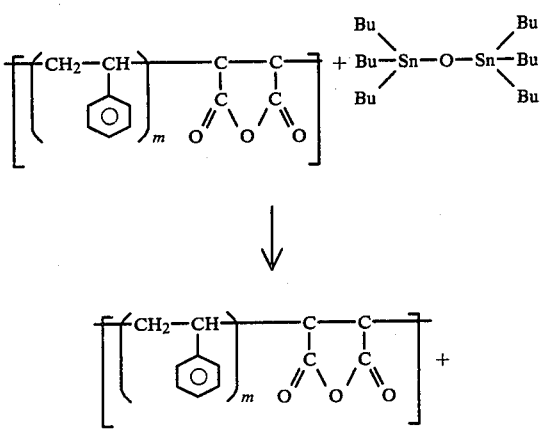

| SMA Resin | Molecular Weight[2] | Melting Range, °C. | Acid No. | Solutions in Aqueous Ammonia | | | |
|---|---|---|---|---|---|---|---|
| | | | | 15% NVM[1] Viscosity (cps.) | Gardner Color | 20% NVM Viscosity (cps.) | 30% NVM Viscosity (cps.) |
| 1000 | 1600 | 150–170 | 480 | 17 | 1–2 | 28 | 50 |
| 2000 | 1700 | 140–160 | 350 | 26 | 1–2 | 136 | 17000 |
| 3000 | 1900 | 115–130 | 275 | 52 | 1 | gel | gel |
| 1440 | 2500 | 55–75 | 175 | 27 | 2 | 88 | 3500 |
| 17352 | 1700 | 160–170 | 270 | 24 | <1 | 50 | 2400 |
| 3840 | 2300 | 100–120 | 105 | | INSOLUBLE | | |

[1] Non-volatile material
[2] Number average

Other compounds having terminal vinyl groups such as vinylbenzene may be used instead of styrene, and examples of other compatible anhydrides include citraconic anhydride and methyltetrahydophthalic anhydride. Thus, copolymers such as the maleic anhydride adduct of methylcyclopentadiene, and the copolymer of maleic anhydride and vinyl ether may be used in place of the styrene-maleic anhydride copolymer. The amount of organotin oxide that is combined with the styrene-maleic anhydride resins depends upon the desired degree of esterification of the maleic anhydride groups. Preferably, the degree of esterification of the maleic anhydride groups ranges from about 40% to about 80% with an optimum value of about 60%, wherein the unreacted maleic anhydride groups are utilized to crosslink with the particular epoxy resins of the coating. Thus, the styrene-maleic anhydride copolymer serves as an

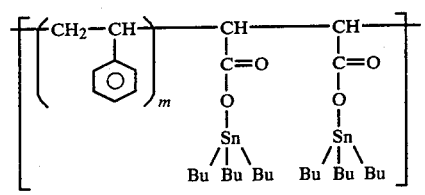

EXAMPLE

Preparation of TBTO and Styrene-Maleic Anhydride Copolymer 404 grams of styrene-maleic anhydride resin (SMA Resin 1000A by ARCO Chemical Co.) was combined with 715 grams of tributyltin oxide (M & T Chemical Co.) and 200 ml. of toluene solvent for 2 to 4 hours with periodic sampling followed by infrared analysis to indicate the extent of esterification. Periodic mixing was performed to maintain the temperature of the mixture between about 60° C. and 110° C. during this period. The final analysis indicated a reaction product which contained the desired proportion of esterification product and unreacted maleic anhydride groups. The final esterification mixture was then combined directly with selected Bisphenol A type epoxy resins, polyacrylate, pigment, and fillers to achieve the desired coating formulation. Prior to applying the epoxy based antifouling coating, an accelerator/initiator is mixed with the coating formulation to initiate the reaction of the epoxy molecules.

A preferred class of resins found compatible for combination with the reaction product and byproduct of the esterification of tributyltin oxide and the styrene-maleic anhydride copolymer are epoxy compounds such as 2,2-bis(4,4'-hydroxy-phenyl) propane, often referred to as diglycidal ether of Bisphenol A. Glycidal ethers suitable for use in the present coating composition should exhibit viscosities of 16,000 to 20,000 centipoises or less at ambient temperatures and have an epoxide equivalent weight in the range of about 170 to about 700, and preferably between about 175 and 250. The glycidyl ethers are derived from compounds containing one or more hydroxyl groups bonded to the carbon atoms of the aromatic ring structure. These compounds have the general structure

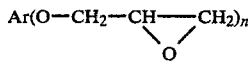

where Ar is representative of the aromatic groups and n varies, for example, from between 2 and 10. The Ar groups can be phenyl or naphthyl radicals which can be bonded directly to one another as in the biphenyl radical. Alternatively, the aromatic ring structures may be separated by alkylene or by other divalent radicals such as hydroxy-phenyl groups as occur in the Bisphenol A epoxy. Other examples of suitable epoxy compounds include 2,2 bis(4-(2,3 epoxy propyl) cyclohexyl) propane, diglycidyl ether of resorcinol, bis(2-dihydroxynaphthyl) methane, hydroquinone, and bis(4-hydroxyphenyl)-1,1 isobutane. A number of commercially useful diglycidyl ethers of Bisphenol A epoxide resins and oligomers are listed in Chapter 4 of the publication entitled "Handbook of Epoxy Resins" by H. Lee and K. Neville (McGraw Hill Book Company, New York, 1967).

In accordance with this invention, polyacrylate esters or polymethacrylate ester compositions have been blended with the abovementioned epoxide resins to reduce the viscosity of the antifouling coating system thereby reducing the requisite amount of solvent; to improve the uniform dispersion of antifoulant throughout the coating matrix; and to improve the physical properties of the coating. The polyacrylate or polymethacrylate ester of a polyol blend preferably contains more than one terminal acrylate or methacrylate group, with the epoxide resin and the ester being present in weight ratios of, for example, 100 parts of epoxide resin to about 5 to about 100 parts by polyacrylate ester. These esters described above are the acrylic and methacrylic acid esters of aliphatic polyhydric alcohols such as, for example, the dipolyacrylates, polyacrylates, dipolymethacrylates, and polymethacrylates of alkylene glycols, alkoxylene glycols, alicyatic glycols and higher polyols such as hexanediol, trimethyloethane, tetramethylene glycol, mixtures thereof, and the like. Further compounds include tetramethylene glycol dimethacrylate, trimethylolpropane triacrylate, trimethylolethane triacrylate, pentaerythritol triacrylate, 1,6 hexanediol dimethacrylate, dipentaerythritol pentacrylate, and the like.

Preparation of the antifouling coating is accomplished by mixing two components, "A" and "B," prior to application of the antifouling coating material to the substrate. A stand-in time is allowed prior to application to allow the chemical reaction between the materials in components "A" and "B". Component "A" normally contains the epoxy resin and the organometallic antifoulant (ie. tributyltin oxide ester of the copolymer of styrene-maleic anhydride in the preparation solvent) and component "B" contains the curing agent or accelerator in a solvent which is compatible with the materials in component "A". A ketone solvent is preferred, to produce a ketamide complex that blocks or otherwise reduces the reaction rate of the accelerator/curing agent with the epoxide group. Selected fillers, pigments and other materials can be added to component "A" or "B" or the mixture thereof prior to application of the coating.

EXAMPLE 1

|  | Parts (by weight) | Preferred Range (percent by weight) |
| --- | --- | --- |
| Organotin copolymer (tributyltin oxide ester of styrene-maleic anhydride copolymer) | 160 | 40-55 |
| Solvent |  |  |
| methyl ethyl ketone | 20 | 5-10 |
| ethyl Cellosolve | 5 | 1-4 |
| Bisphenol A (EEW about 190) | 80 | 25-40 |
| 1,5 pentanediol diacrylate | 18 | 7-15 |
| Accelerator (Epi-Cure 855 or Epi-Cure 856) | 35 | 5-10 |
| Filler (ie. Quso WR by Philadelphia Quartz) | 4 | 2-6 |
| Pigment (black pigment ie. Ravin 8000) | 4 | 2-6 |

(1) EEW is epoxy equivalent weight.

In the above formulation, the ethyl Cellosolve, which is a glycol ether, provides viscosity reduction of the coating system and extends the pot life of the epoxy resin mixture. One example of a lower equivalent weight Bisphenol A epoxy is EPON Resin 828, a trademarked product of Shell Chemical Co. having an average molecular weight of about 380 and an average equivalent weight of about 180. Examples of other polyacrylates include 1,2 hexanediol diacrylate and 1,6 hexanediol diacrylate. The particular curing agents used in the above formulation are aliphatic amido amines manufactured by Celanese Resin Company. Another compatible filler is fumed silica such as Cab-O-Sil, a trademarked product of the Cabot Corporation.

EXAMPLE 2

|  | Parts (by weight) | Preferred Range (percent by weight) |
| --- | --- | --- |
| Organotin copolymer | 160 | 20-50 |
| Solvent | | |
| methyl ethylketone | 30 | 6-20 |
| ethyl Cellosolve | 15 | 2-8 |
| Bisphenol A (EEW about 500) | 100 | 25-55 |
| 1,5 pentanediol diacrylate | 18 | 7-15 |
| Accelerator | 35 | 5-10 |
| (Epi-Cure 855 or Epi-Cure 856) | | |
| Fillers | 4 | 2-6 |
| (ie. Quso WR) | | |
| Pigment | 4 | 2-6 |
| (black pigment ie. Ravin 8000) | | |

Preferred accelerators or curing agents for the antifouling coating include aliphatic amido amines and polyalkylene amines such as diethylene/triamine, triethylene/tetraamine, and tetraethylene. Other useful amines include ethylene diamine, tetramethylene diamine, hexamethylene diamine, and the like.

Obviously, many modifications and variations are possible in light of the above teachings. It is therefore to be understood that within the scope of the appended claims the invention may be practiced otherwise than as specifically described.

What is claimed is:

1. A marine antifouling coating formulation consisting essentially of, by weight:

from about 20% to about 55% of the esterification product produced by reacting tributylin oxide with a copolymer of styrene and maleic anhydride, wherein from about 0.4 to about 0.8 moles of said oxide are combined with each mole of said copolymer;

from about 5% to about 28% solvent;

from about 25% to about 55% of a diglycidyl ether of Bisphenol A epoxy compound;

from about 7% to about 15% of an acrylic or methacrylic acid ester of an aliphatic polyhydric alcohol;

from about 5% to about 10% of an aliphatic amine curing agent;

from about 2% to about 6% filler; and from about 2% to about 6% pigment.

2. A marine antifouling formulation according to claim 1, wherein the Bisphenol A epoxy has an epoxy equivalent weight of between about 170 and 700.

3. A marine antifouling formulation according to claim 1, wherein the Bisphenol A epoxy has an epoxy equivalent weight of between about 170 and 250.

4. A maring antifouling formulation according to claim 1 wherein the solvent comprises methyl ethyl ketone and ethylene glycol monoethyl ether.

5. A marine antifouling coating formulation consisting essentially of, by weight:

from about 40% to about 55% of the esterification product produced by reacting tributyltin oxide with a copolymer of styrene and maleic anhydride, wherein from about 0.4 to about 0.8 moles of said oxide are combined with each mole of said copolymer;

from about 5% to about 10% of ketone solvent;

from about 25% to about 40% of a diglycidyl ether of Bisphenol A epoxy compound having an average epoxy equivalent weight of between about 170 to 250;

from about 7% to about 15% of an acrylic or methacrylic acid ester of an aliphatic polyhydric alcohol;

from about 5% to about 10% of an aliphatic amine curing agent;

from about 2% to about 6% filler; and from about 2% to about 6% pigment.

* * * * *